United States Patent Office 3,159,651
Patented Dec. 1, 1964

3,159,651
ACROLEIN DIMER PRODUCTION
George F. Johnson, Baytown, and Lawrence C. Teague, Houston, Tex., assignors to Shell Oil Company, New York, N.Y., a corporation of Delaware
No Drawing. Filed July 20, 1962, Ser. No. 211,427
3 Claims. (Cl. 260—345.9)

This invention relates to an improved process for the production of acrolein (or substituted acrolein) thermal dimer wherein the production of the higher polymers is substantially inhibited. More particularly, the present invention relates to a process for producing acrolein (or substituted acrolein) thermal dimer by conducting the dimerization step in the presence of an acidic constituent.

It is known that dimers of acrolein compounds may be prepared by heating acrolein or substituted acrolein derivatives in the absence of air and water according to the following reaction:

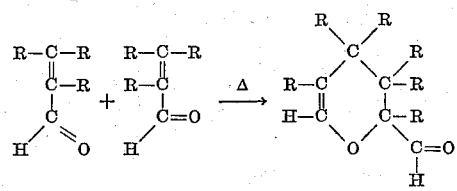

wherein R is selected from the group consisting of hydrogen and a lower hydrocarbon group of 1 to 6 carbon atoms. However, it is difficult to stop the reaction at the dimer stage and the manufacture of acrolein thermal dimer is often accompanied by the production of large amounts of higher acrolein polymers. These higher polymers very often contaminate the process system as well as the final acrolein dimer produced. These by-products are heavier than the dimer which is formed. While the reactions forming this heavy product are not known with certainty, it is known that the dimer can polymerize with itself or react with acrolein or substituted acrolein to form so-called "heavies." Some of the impurities in the acrolein or substituted acrolein feed (such as propionaldehyde, acetaldehyde, acetone, isopropyl alcohol, normal propyl alcohol, and water) also react to form "heavies." However, the proportion of heavy products resulting from the reaction of these impurities becomes significant only if the impurities are present at relative high concentrations (20–40% by weight) such as might be reached in a process system which involves the recycle of unreacted acrolein compounds. In addition to the formation of these heavy contaminants, the presence of lower alcohols (such as methanol, isopropanol, and normal propanol) and water at relatively low concentrations (about 2% or less by weight) promotes the formation of these heavy polymeric-type compounds. Both the alcohols and water appear to catalyze the polymerization of acrolein dimer and/or acrolein, and the resultant dimer yield losses due to these reactions can be quite large when compared to the reduction in dimer yield which occurs through the other "heavies"-producing reactions mentioned previously.

It is an object of the present invention to provide a process for the production of thermal dimers of acrolein compounds in which the amounts of higher polymers are either reduced or substantially eliminated. Other objects of the invention will be apparent from the following detailed description of the invention. The reduction of higher polymers (known as "heavies") is of the utmost importance in the large scale production of acrolein dimers because the gradual build up of these impurities in a continuous dimerization process may result in a complete shut-down of the operation.

It has now been found that the formation of higher polymers of acrolein compounds during the production of the dimers of such acrolein compounds may be substantially inhibited by conducting the dimerizaion step in the presence of an acid with a dissociation (ionization) constant ($K_A$) of from about $10^{-4}$ to $10^{-2}$. Acids within this range may be used in the commercial production of acrolein dimer to prevent the rapid build-up of polymerization products which result in clogged reactors and process lines.

Suitable acids which may be incorporated into the reaction zone include both organic and inorganic acids with ionization constants of from $10^{-4}$ to $10^{-2}$ at temperatures of from 17° C. to 25° C. Thus, inorganic acids, such as arsenic acid ($H_3A_5O_4$), tellurous acid ($H_2TeO_3$), and selenious acid ($H_2SeO_3$) may be employed as inhibitors in the production of thermal dimers of acrolein. Organic acids with an ionization constant of from $10^{-4}$ to $10^{-2}$ are preferred inhibitors because there is less tendency for these inhibitors to appear as contaminants in the final dimer products. Organic acids which are suitable inhibitors include lactic acid, malic acid, glycolic acid, methoxyacetic acid, thioglycolic acid, cyanoacetic acid, malonic acid, barbituric acid, formic acid, gluconic acid (pentahydroxy hexoic acid), glucuronic acid (glycuronic acid), bromoacetic acid, chloroacetic acid, α-bromopropionic acid, α-chloropropionic acid, phthalic acid, pyromucic acid, sulfanilic acid, citraconic acid, citric acid, hippuric acid, tetrolic acid, itaconic acid, fumaric acid, mandelic acid, α-napthoic acid, tartaric acid, salicylic acid, measaconic acid, mucic acid, and tartronic acid.

Polycarboxylic acids with a suitable ionization constant include aryl carboxylic acids such as isophthalic, terephthalic, hemimellitic, trimellitic, trimesic, prehnitic, mellophanic, pyromellitic, benzenepentacarboxylic, mellitic, phenylpropiolic, and phenylene diacetic acid. Hydroxy substituted polycarboxylic acids containing only carbon, oxygen, and hydrogen, from 4 to 12 carbon atoms with from 2 to 6 carboxyl groups, and from one to three (preferably from one to two) hydroxy groups are particularly suitable inhibitors when their ionization constant is from $10^{-4}$ to $10^{-2}$. For example, tartaric and citric acids may be employed as inhibitors. Mixtures of any of these acids may be used as long as the apparent ionization constant of the mixture is from $10^{-4}$ to $10^{-2}$.

Only an inhibiting amount of acid (preferably of polycarboxylic organic acid) with an ionization constant of from $10^{-4}$ to $10^{-2}$ is needed in the reaction zone. Amonts of acid of from 10 parts per million (p.p.m.) to 1000 parts per million based on either the total weight of the reaction mixture or on the total weight of the acrolein compounds (monomers) in the reaction zone may be used. When polycarboxylic organic acids such as d- or l-tartaric acid are used, an amount of acid of from .001% to 0.1% (based on the weight of the total reaction mixture) may be used with good results when the reaction mixture contains from 50 to 100 percent by weight of unconverted acrolein compound monomers.

The acid inhibitor may be added to the acrolein compound as it is fed to the dimerization reactor, or can be added directly to the reactor. In a continuous dimerization process it is generally preferable to add the acid inhibitor to the feed just prior to the addition of the feed to the dimerization reactor. One of the advantages obtained by employing the acidic inhibitors according to the process of the present invention is that these acidic inhibitors have been found to retard the type of polymerization which is promoted by the presence of alcohols and/or water in the reaction zone. Thus, by incorporating an inhibiting amount (usually from .005 to 0.1% based on the total weight of the reaction mixture) of an acid, such as a dicarboxylic acid with an ionization constant of from $10^{-4}$ to $10^{-2}$, into the reaction zone it is possible to realize high dimer yields from acrolein feeds containing water and/or alcohols. Excellent results have been obtained, for example, with from .01% to 0.1% by weight based on the total reaction mass of tartaric acid using acrolein feeds containing from 5% to 46% by weight of impurities. The process of the present invention is therefore especially useful in commercial dimerization processes employing recycle systems which contain appreciable amounts of alcohol and/or water. The dimerization may be carried out at atmospheric or superatmospheric pressure and at temperatures of from about 100° C. to 300° C. (usually from 100° C. to 200° C.) without appreciably decreasing the inhibiting effect of the acids.

The following examples are submitted for the purpose of illustration only and are not to be construed as limiting the scope of the invention in any way.

Table I contains a summary of the results obtained when various acrolein feed compositions were heated at temperatures of from 185° C. to 195° C. for from 45 to 75 minutes. This is the conventional method for producing acrolein dimers. At the end of the heating period in each example, the reactor was quenched in cold water. The reaction mixture was agitated for about five minutes during the beginning of the heating step. The mixtures were heated at a rate sufficient to bring the temperature to about 185°–195° C. within a five minute heating period.

*Table I*

| Example Number | Tartaric Acid Inhibitor, p.p.m. | Feed Composition, Percent Weight | | | | Reaction Product Composition, Percent Weight | | Total Conversion Based on Acrolein | Yield of Acrolein Dimer Based on Amount of Acrolein Converted | Increase in Yield (Percent) Due to Inhibitor |
|---|---|---|---|---|---|---|---|---|---|---|
| | | $H_2O$ | $CH_3OH$ | $H_3C{-}\underset{OH}{\overset{H}{C}}{-}CH_3$ | Total Impurities [a] | Acrolein Dimer | "Heavy" Impurities (Polymer) | | | |
| III | 0 | <0.03 | 0.0 | 0.0 | About 4 | 55.4 | 4.3 | 56.3 | [c] 93 | } 2.0. |
| IV | 100 | <0.03 | 0.0 | 0.0 | 3.5 | 50.9 | 2.9 | 56.9 | [c] 95 | |
| V | 0 | 2.9 | 0.0 | 0.0 | 6.6 | 41.0 | 14.4 | 55.5 | [b] 73 | } 21.0. |
| VI | 100 | 2.9 | 0.0 | 0.0 | 6.6 | 50.3 | 3.1 | 53.5 | [b] 94 | |
| VII | 0 | 0.03 | 5.2 | 0.0 | 9.1 | 37.0 | 15.0 | 57.3 | [b] 71 | } 16.0. |
| VIII | 100 | 0.03 | 5.7 | 0.0 | 9.2 | 44.2 | 6.5 | 56.0 | [b] 87 | |
| IX | 0 | 0.39 | 1.0 | 1.2 | 21.6 | 43.6 | 6.9 | 64.4 | [c] 88 | } 9.0. |
| X | 100 | 0.39 | 1.0 | 1.2 | 21.6 | 44.7 | 2.2 | 59.7 | [c] 97 | |
| XI | 100 | 0.39 | 0.75 | 0.95 | 15.3 | 44.4 | 2.4 | 55.3 | [c] 95 | } Not applicable. |
| XII | 500 | 0.39 | 0.75 | 0.95 | 15.3 | 44.9 | 3.7 | 57.5 | [c] 93 | |
| XIII | 1,000 | 0.39 | 0.75 | 0.95 | 15.3 | 44.0 | 6.0 | 59.2 | [c] 90 | |
| XIV | 0 | 0.39 | 0.55 | 0.79 | 46.3 | 24.8 | 3.4 | 52.7 | [c] 90 | } 9.0. |
| XV | 100 | 0.39 | 0.55 | 0.79 | 46.3 | 24.2 | 1.9 | 48.2 | [c] 99 | |

[a] The major components of the impurities were propionaldehyde and acetone.
[b] Yield calculated on the basis of the amount of dimer produced compared with "Heavies" (polymer): Yield=grams dimer×100/grams dimer+grams "heavies."
[c] Yield calculated on the basis of the amount of dimer produced compared with the total amount of acrolein reacted: Yield=grams dimer×100/grams of acrolein reacted.

EXAMPLE I

A mixture containing 77.3% acrolein, a trace of hydroquinone, 1.1% methyl alcohol, and 1.6% isopropyl alcohol was heated, with agitation, over a period of 62 minutes to a temperature of 192° C. About 17% of the total reaction mass was made up of a mixture of propionaldehyde and acetone. The temperature was raised rapidly from room temperature to 133° C. in 2.0 minutes, to 179° C. after 4.0 minutes, and to 192° C. after 7.0 minutes. The temperature was held at about 192° C. until the end of the heating period (62 minutes total) at which time the reaction mixture was quenched in cool water. The reaction product contained 32.4% by weight of acrolein dimer (3,4-dihydro-1,2-pyran-2-carboxaldehyde) and 13.1% by weight of polymer. This represents a yield of 71% and a 58.8% by weight conversion of acrolein.

EXAMPLE II

Example I was repeated but with the addition of tartaric acid (.01% by weight of tartaric acid based upon the total weight of the reaction mixture). The temperature was 192° C. after eight minutes heating. The total heating time was again 62 minutes. After quenching in cool water, the reaction product was found to contain 36.4% by weight of acrolein dimer (3,4-dihydro-1,2-pyran-2-carboxaldehyde) and only 3.8% by weight of polymer. These figures represent a 90% by weight yield based upon a 52% conversion of acrolein.

EXAMPLE XVI

A mixture of acrolein containing a total of 28.9% by weight of impurities (including 0.5% water, 0.9% methyl alcohol, and 1.1% isopropyl alcohol) was heated in a bath maintained at 190° C. with recycle of unconverted acrolein and light ends. The reaction product contained 39.1% by weight of acrolein dimer and 2.5% by weight of heavy product (polymer). The total conversion of acrolein to the dimer was 43.8%. The yield based upon the amount of acrolein reacted was 96%.

EXAMPLE XVII

Example XVI was repeated, but with the addition of 100 p.p.m. of tartaric acid to the acrolein feed. The acrolein feed contained 25.5% by weight of total impurities (including 0.5% water, 1.0% methyl alcohol, and 1.2% isopropyl alcohol). The reaction product contained 41.3% by weight of acrolein dimer and only 1.8% by weight of heavy product. The total conversion to the dimer based on the acrolein feed was 44.0%. The yield of acrolein dimer based upon the amount of acrolein fed was 99%.

EXAMPLE XVIII

This experiment is similar to Example XVI except that the unconverted acrolein and light ends (water, methyl alcohol, and isopropyl alcohol) were not recycled. The total impurities in the acrolein feed composition amounted to 4.7% by weight (including 2.0% by weight of water). The reaction product obtained after heating contained 44.3% by weight of acrolein dimer and 14.2% by weight of "heavy" material (largely polymers heavier than acrolein). The total conversion of acrolein to the dimer was 61.6%, the yield $$\left(\frac{\text{grams dimer} \times 100}{\text{grams dimer} + \text{grams polymer}}\right)$$

was 76%.

EXAMPLE XIX

Example XVIII was repeated but with 100 parts per million of tartaric acid incorporated into the feed to the reactor. The total impurities in the acrolein feed were the same as in Example XVIII (4.7% total, 2.0% water). The reaction product obtained after heating contained 44.9% by weight of acrolein dimer and the amount of heavy polymer was reduced to 11.4% by weight. The acrolein conversion was 58.9%. The yield (calculated as in Example XVIII) was 80%.

28% of theoretical. The yield of acrolein dimer was 87%. Repetition of the operation with 0.01% by weight of tartaric acid gave a conversion of 28% and a 95% acrolein dimer yield. This experiment shows that the addition of acid to the reactor restores the yield of acrolein dimer to the yields which are obtainable in the absence of impurity-promoted polymerization.

Table II illustrates the effect of the acid in reducing the amount of polymer formed during the dimerization reaction of acrolein compounds which contain various amounts and kinds of impurities.

*Table II*

| Example No. | Percent by Weight of Polymer in the Reaction Product Without Acid (A) | Percent by Weight of Polymer in the Reaction Product with 100 p.p.m. of Acid | Examples Compared | Percent Decrease in Polymer Production $\frac{A-B}{A} \times 100$ |
|---|---|---|---|---|
| I | 13.1 | | } I & II | 67.4 |
| II | | 3.8 | | |
| III | 4.3 | | } III & IV | 32.6 |
| IV | | 2.9 | | |
| V | 14.4 | | } V & VI | 78.5 |
| VI | | 3.1 | | |
| VII | 15.0 | | } VII & VIII | 56.7 |
| VIII | | 6.5 | | |
| IX | 6.9 | | } IX & X | 68.1 |
| X | | 2.2 | | |
| XIV | 3.4 | | } XIV & XV | 44.2 |
| XV | | 1.9 | | |
| XVI | 2.5 | | } XVI & XVIII | 28.0 |
| XVII | | 1.8 | | |
| XVIII | 14.2 | | } XVIII & XIX | 19.4 |
| XIX | | 11.4 | | |

EXAMPLE XX

A feed composition containing 74.4% acrolein, 1.0% methanol, 1.2% propanols, 0.6% water, 9.1% propionaldehyde, 3.1% acetaldehyde, 1.1% propylene oxide, and 9.5% acetone (all percentages by weight) was heated at from 190–195° C. for approximately one hour. The acrolein conversion was 45%. The yield calculated on the amount of acrolein converted was 95%. Repetition of the operation with 0.01% by weight (based on the total reaction mixture) of tartaric acid gave a 97% yield with the same acrolein conversion (45%).

EXAMPLE XXI

A feed composition containing 59.4% acrolein, 1.3% methanol, 1.3% propanols, 1.3% water, 19.5% propionaldehyde, 2.0% acetaldehyde, 1.7% propylene oxide, and 13.5% acetone (all percentages by weight) was heated at from 190–195° C. in a pilot plant backmixed reactor for approximately one hour. The acrolein conversion was

We claim as our invention:
1. In a process for producing 3,4-dihydro-1,2-pyran-2-carboxaldehyde by the thermal dimerization of an acrolein feed containing appreciable amounts of alcohol and water at a temperature of from about 100° C.–300° C., the improvement of effecting the dimerization and inhibiting the production of heavy polymers by conducting the thermal dimerization in the presence of an added amount of from 0.001% to 0.1% by weight of the reaction mixture of a polycarboxylic organic acid having an ionization constant of from $10^{-4}$ to $10^{-2}$ inclusive.
2. The process of claim 1 wherein the acid is tartaric acid.
3. The process of claim 1 wherein the acid is citric acid.

References Cited in the file of this patent

UNITED STATES PATENTS 2,537,579    Fountain et al. _____ Jan. 9, 1951